United States Patent
Bassov et al.

(10) Patent No.: US 10,579,593 B2
(45) Date of Patent: Mar. 3, 2020

(54) TECHNIQUES FOR SELECTIVELY DEACTIVATING STORAGE DEDUPLICATION

(71) Applicant: EMC IP Holding Company LLC, Hopkinton, MA (US)

(72) Inventors: Ivan Bassov, Brookline, MA (US); Ahsan Rashid, Edison, NJ (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 221 days.

(21) Appl. No.: 15/885,037

(22) Filed: Jan. 31, 2018

(65) Prior Publication Data
US 2019/0236163 A1 Aug. 1, 2019

(51) Int. Cl.
G06F 3/06 (2006.01)
G06F 16/11 (2019.01)
G06F 16/174 (2019.01)

(52) U.S. Cl.
CPC ........ G06F 16/1748 (2019.01); G06F 3/0641 (2013.01); G06F 3/0643 (2013.01); G06F 16/128 (2019.01)

(58) Field of Classification Search
CPC .. G06F 16/1748; G06F 16/128; G06F 3/0643; G06F 3/0641; G06F 16/174
See application file for complete search history.

(56) References Cited

U.S. PATENT DOCUMENTS

| | | | | |
|---|---|---|---|---|
| 8,572,163 | B1* | 10/2013 | Bromley | G06F 16/1748 709/203 |
| 8,606,753 | B2* | 12/2013 | Mu | G06F 11/1453 707/650 |
| 8,799,601 | B1 | 8/2014 | Chen et al. | |
| 8,930,687 | B1 | 1/2015 | Robinson et al. | |
| 9,122,697 | B1 | 9/2015 | Bono et al. | |
| 9,569,455 | B1 | 2/2017 | Bono et al. | |
| 9,690,837 | B1 | 6/2017 | Davenport et al. | |
| 2010/0250501 | A1 | 9/2010 | Mandagere et al. | |
| 2014/0095439 | A1 | 4/2014 | Ram | |
| 2014/0304239 | A1* | 10/2014 | Lewis | G06F 3/0608 707/692 |
| 2016/0092138 | A1* | 3/2016 | Knestele | G06F 3/0619 711/103 |
| 2016/0196320 | A1* | 7/2016 | Borowiec | G06F 3/0608 707/624 |
| 2016/0342618 | A1* | 11/2016 | Watkins | G06F 16/178 |

(Continued)

OTHER PUBLICATIONS

Alan L. Taylor et al.; "Efficient File Copy That Avoids Data Deduplication," U.S. Appl. No. 14/041,820, filed Sep. 30, 2013.

(Continued)

*Primary Examiner* — Jorge A Casanova
(74) *Attorney, Agent, or Firm* — BainwoodHuang (57) ABSTRACT

Techniques for effectively measuring the amount of space saved due to deduplication and selectively turning deduplication off for a filesystem if the savings are too low are provided. The techniques include maintaining both a lower bound count and an upper bound count for block savings due exclusively to deduplication rather than due to snapshots and using an average of the lower and upper bounds to estimate the actual savings due to deduplication in order decide whether to continue operating deduplication or not.

14 Claims, 6 Drawing Sheets

(56) References Cited

U.S. PATENT DOCUMENTS

2017/0177266 A1* 6/2017 Doerner .............. G06F 3/0641
2018/0039442 A1 2/2018 Shadrin et al.

OTHER PUBLICATIONS

Jean-Pierre Bono et al.; "Selective Application of Block Virtualization Structures in a File System," U.S. Appl. No. 14/577,387, filed Dec. 19, 2014.

Ying Hu et al.; "Performing Block Deduplication Using Block Sequence Classifications," U.S. Appl. No. 14/671,017, filed Mar. 27, 2015.

Philippe Armangau et al.; "Inline Deduplication of Compressed Data," U.S. Appl. No. 14/980,944, filed Dec. 28, 2015.

Nickolay Alexandrovich Dalmatov; "Backup Server Selection Based on Data Commonality," U.S. Appl. No. 15/321,500, filed Dec. 22, 2016.

Ilya Usvyatsky et al.; "Techniques for De-Duplicating Data Storage Systems Using a Segmented Index," U.S. Appl. No. 15/394,376, filed Dec. 29, 2016.

Morgan A. Clark et al.; "De-Duplication of Access Control Lists," U.S. Appl. No. 14/602,251, filed Jan. 21, 2015.

Philippe Armangau et al.; "Speeding De-Duplication Using a Temporal Digest Cache," U.S. Appl. No. 15/668,388, filed Aug. 3, 2017.

Ilya Usvyatsky et al.; "Performing Reconciliation on a Segmented De-Duplication Index to Reference Just One of a First Copy and a Second Copy of a Particular Data Block," U.S. Appl. No. 15/664,185, filed Jul. 31, 2017.

Philippe Armangau et al.; "Optimizing Inline Deduplication During Copies," U.S. Appl. No. 15/798,740, filed Oct. 31, 2017.

Philippe Armangau et al.; "Speeding Deduplication Using a Most Wanted Digest Cache," U.S. Appl. No. 15/799,117, filed Oct. 31, 2017.

Ivan Bassov et al.; "Reporting of Space Savings Due to Pattern Matching in Storage Systems," U.S. Appl. No. 15/800,590, filed Nov. 1, 2017.

Jeremy Swift; "Systems and Methods of Performing Data Deduplication and Compression on Spinning Media," U.S. Appl. No. 62/504,943, filed May 11, 2017.

Nickolay Alexandrovich Dalmatov; "Best-Effort Deduplication of Data While the Data Resides in a Front-End Log Along an I/O Path That Leads to Back-End Storage." PCT Patent Application No. PCT/RU2017/000274, filed Apr. 27, 2017, 30 pages.

* cited by examiner

TECHNIQUES FOR SELECTIVELY DEACTIVATING STORAGE DEDUPLICATION

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Some data storage systems organize data into filesystems, which are stored on respective LUNs. In example operation, users of host computing systems connect to storage processors of data storage systems, mount previously created filesystems, and proceed to read and write files of the filesystems, create new files and directories, delete files and directories, etc.

Some data storage systems employ deduplication. To perform deduplication, a program searches a filesystem for data blocks having identical values. The program then replaces duplicate blocks with pointers to a single retained copy. Deduplication can save considerable space in filesystems that store multiple copies of the same data.

SUMMARY

Although deduplication is capable of saving a considerable amount of space under some circumstances (especially filesystems that store many similar files), performing deduplication can be computationally expensive (e.g., it uses a large number of processing cycles and memory). This computational expense may be justified when the space savings due to the deduplication is considerable. However, in filesystems that do not store much repetitive data, the space savings due to deduplication may be minimal, and the computational expense may therefore not be justifiable.

Thus, it would be desirable to effectively measure the amount of space saved due to deduplication and to selectively turn deduplication off for a filesystem if the savings are too low. This task can be particularly challenging in the context of filesystems having point-in-time snapshots of previous states of the filesystem, since snapshots often exploit redundancy to save space and it can be difficult to distinguish savings due to deduplication from the use of redundancy-exploiting snapshots. Thus, embodiments are directed to techniques that overcome this difficulty by maintaining both a lower bound and an upper bound for block savings due exclusively to deduplication rather than due to snapshots and using an average of the upper and lower bounds to estimate the actual savings due to deduplication in order decide whether to continue operating deduplication or not. In addition, some embodiments automatically change a savings threshold based on measured system resource utilization.

In one embodiment, a method of improving operation of a data storage system (DSS) device hosting a filesystem and snapshots associated with the filesystem is performed. The method includes (a) operating the DSS device to process storage operations directed at the filesystem using a deduplication feature, the deduplication feature causing two or more identical logical data blocks at different logical addresses within the filesystem to be stored only once within persistent storage of the DSS device, (b) while operating the DSS device to process storage operations using the deduplication feature, maintaining a count of how many logical data blocks currently within the filesystem have been deduplicated by the deduplication feature, (c) while operating the DSS device to process storage operations using the deduplication feature, maintaining an estimate of how many logical data blocks currently within either the filesystem or the associated snapshots have been deduplicated by the deduplication feature, (d) performing a comparison operation, the comparison operation testing whether an average of the count and the estimate represents less than a threshold percentage of a sum of all logical data blocks addressed by the filesystem and any additional different logical data blocks addressed by any of the associated snapshots, (e) in response to the comparison operation yielding a negative result, continuing to operate the DSS device to process storage operations directed at the filesystem using the deduplication feature, and (f) in response to the comparison operation yielding an affirmative result, turning off deduplication while continuing to operate the DSS device to process storage operations directed at the filesystem but without using the deduplication feature. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

Embodiments are directed to techniques for effectively measuring the amount of space saved due to deduplication and selectively turning deduplication off for a filesystem if the savings are too low. This task can be particularly challenging in the context of filesystems having point-in-time snapshots of previous states of the filesystem, since snapshots often exploit redundancy to save space and it can be difficult to distinguish savings due to deduplication from the use of redundancy-exploiting snapshots. Thus, embodiments are directed to techniques that overcome this difficulty by maintaining both a lower bound and an upper bound for block savings due exclusively to deduplication rather than due to snapshots and using an average of the upper and lower bounds to estimate the actual savings due to deduplication in order decide whether to continue operating deduplication or not. In addition, some embodiments automatically change a savings threshold based on measured system resource utilization.

Figure 1:
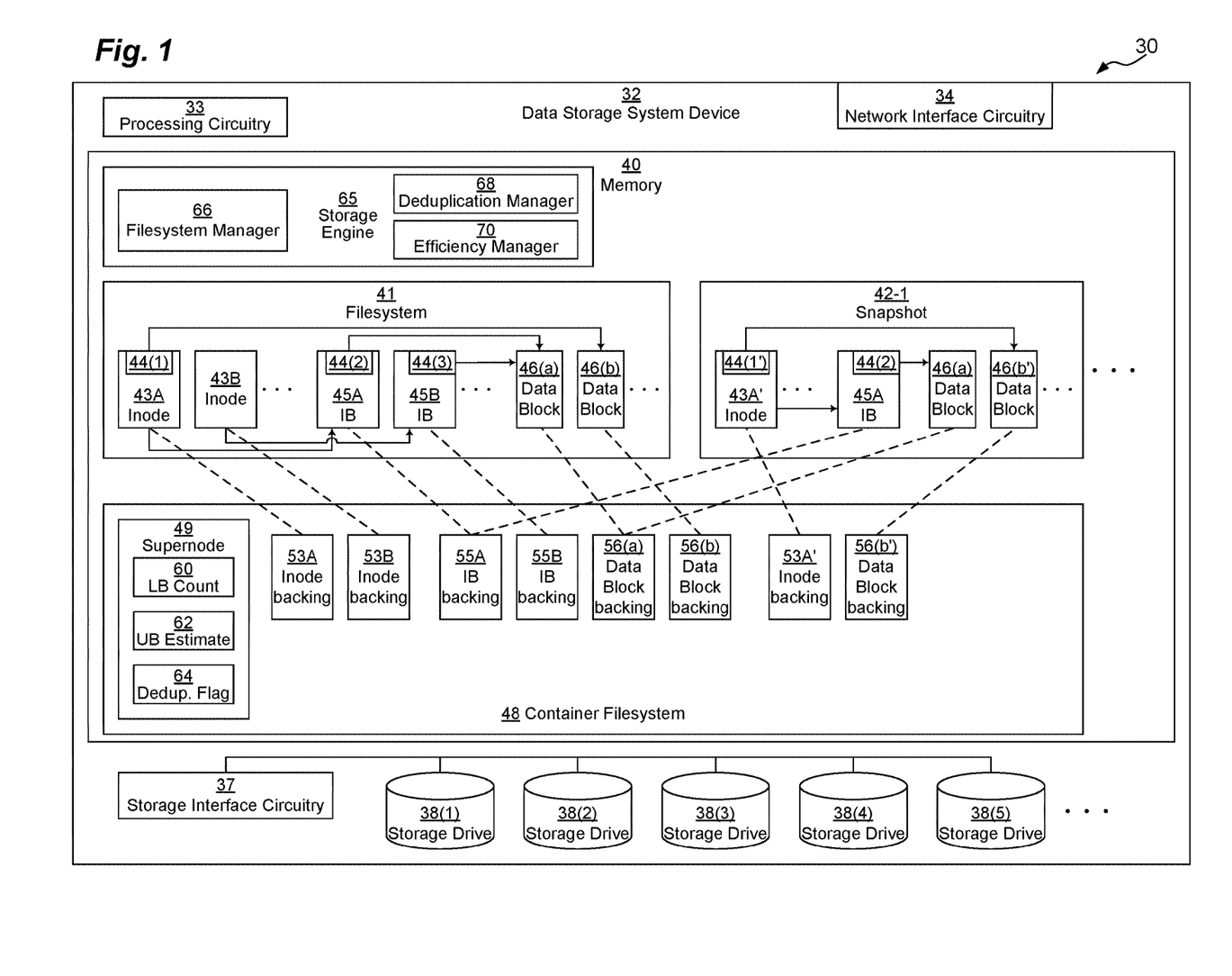
FIG. 1 is a block diagram depicting an example apparatus for use in connection with various embodiments.

FIG. 1 shows an example environment 30 in which embodiments of the improved techniques hereof can be practiced. Here, one or more host computing devices ("hosts," not depicted) access a data storage system device 32 over a network (not depicted). The data storage system 32 includes processing circuitry 33, network interface circuitry 34, storage interface circuitry 37, a set of storage drives 38 (depicted as storage drives 38(1), 38(2), 38(3), 38(4), 38(5), . . . ), and memory 40.

In an example, the storage drives 38 may be arranged into one or more RAID groups where each RAID group is composed of multiple storage drives 38. The storage drives 38 may include magnetic disk drives, electronic flash drives, optical drives, and/or other types of persistent storage. In some embodiments, storage drives 38(1), 38(2), 38(3), 38(4), and 38(5) make up a RAID group.

The network may be any type of network or combination of networks, such as a storage area network (SAN), a local area network (LAN), a wide area network (WAN), the Internet, and/or some other type of network or combination of networks, for example. The hosts may connect to the data storage system 32 using various technologies, such as Fibre Channel, iSCSI, NFS, SMB 3.0, and CIFS, for example. Any number of hosts may be provided, using any of the above protocols, some subset thereof, or other protocols besides those shown. As is known, Fibre Channel and iSCSI are block-based protocols, whereas NFS, SMB 3.0, and CIFS are file-based protocols. In an example, the data storage system 32 is configured to receive I/O requests (not depicted) according to both block-based and file-based protocols and to respond to such I/O requests by reading or writing to the storage drives 38. In another example, the data storage system 32 is configured to receive I/O requests only according to file-based protocols and to respond to such I/O requests by reading or writing to the storage drives 38.

Network interface circuitry 34 is configured to connect to the network. Network interface circuitry 34 may include, for example, a SCSI target adapter or network interface adapters for converting electronic and/or optical signals received over the network to electronic form for use by processing circuitry 33. The processing circuitry 33 includes one or more processing chips and/or assemblies. In a particular example, the processing circuitry 33 may include several multi-core CPUs. The storage interface circuitry 37 may include, for example, SCSI adapters and other disk interface adapters for communicating between the storage drives 38 and the processing circuitry 33 or memory 40.

The data storage system 32 may include multiple storage processors (not depicted). Each storage processor may include its own instance of the processing circuitry 33, network interface circuitry 34, storage interface circuitry 37, and memory 40. Multiple storage processors may be provided as circuit board assemblies, or "blades," which plug into a chassis, which encloses and cools the storage processors. The chassis has a backplane for interconnecting the storage processors, and additional connections may be made among storage processors using cables. It is understood, however, that no particular hardware configuration is required, as any number of storage processors, including a single storage processor, may be provided and the storage processor can be any type of computing device capable of processing host I/Os.

The memory 40 may include both volatile memory (e.g., random access memory, RAM), and non-volatile memory, such as one or more read-only memories (ROMs), disk drives, solid-state drives, and the like. At a minimum, memory 40 includes system memory, typically RAM. The processing circuitry 33 and the memory 40 together form control circuitry, which is constructed and arranged to carry out various methods and functions as described herein, e.g., alone or in coordination with similar control circuitry on another data storage system. Also, the memory 40 includes a variety of software constructs realized in the form of executable instructions. When the executable instructions are run by the processing circuitry 33, the processing circuitry 33 is caused to carry out the operations of the software constructs. Although certain software constructs are specifically shown and described, it is understood that the memory 40 typically includes many other software constructs, which are not shown, such as an operating system, various applications, processes, and daemons. Applications configured to run on processing circuitry 33 when stored in non-transitory form, either in the volatile portion or the non-volatile portion of memory 40 or both, form a computer program product. The processing circuitry 33 running one or more of these applications thus forms a specialized circuit constructed and arranged to carry out the various processes described herein.

As shown in FIG. 1, the memory 40 includes representations of one or more filesystems 41 that the processing circuitry 33 may present to the hosts for storage purposes. Each filesystem 41 is backed by a volume file (not depicted) within a container filesystem 48, which represents a lower layer of a storage I/O stack (not depicted) for processing commands. Each layer of the storage I/O stack represents a different layer of abstraction. At the bottom of the storage I/O stack, all data of the filesystem 41 is ultimately backed by physical storage on the storage drives 38 (although, in some embodiments, some data may temporarily be cached entirely within memory 40 for performance reasons as is well-known in the art).

Filesystem 41 also has one or more associated snapshots 42 (only a single snapshot 42-1 is depicted for clarity). Each snapshot 42 represents a prior state of the filesystem 41, although, in some embodiments, a snapshot 42 may be mounted and subsequently modified. Each snapshot 42 shares some of its data and backing store with the filesystem 41.

As depicted, filesystem 41 includes a set of files (not depicted). Each file has an associated inode 43 (depicted as inodes 43A, 43B, . . . ) that stores metadata about that file such as, for example, the size of the file, creation and modification dates/times, permissions, etc. Inodes 43 also store one or more data pointers 44 to respective data blocks 46 that make up the contents of the file. Many inodes 43 also store indirect pointers (not depicted) that point to indirect blocks (IBs) 45 that store additional data pointers 44 to additional data blocks 46 of the file. The term "file mapping structure" refers to a metadata structure that stores one or more data pointers 44, such as, for example, an inode 43 or an IB 45.

As depicted, inode 43A for a first file includes at least one data pointer 44(1) that points to a first data block 46(b) of the file. Inode 43A also indirectly points to IB 45A, which, in turn, includes at least one data pointer 44(2) to a second data block 46(a) of the file. It should be understood that many data pointers 44 have been omitted for the sake of clarity; in a typical embodiment, each inode 43 includes ten to fifteen data pointers 44 as well as three to five indirect pointers. Each IB 45 typically includes up to 1,024 or more data pointers 44. Filesystem 41 is also depicted as having a second inode 43B representing a second file. Inode 43B indirectly points to IB 45B, which, in turn, includes at least one data pointer 44(3) to data block 46(a) that is shared between the first and second files. Although filesystem 41 may include many data blocks 46(a), 46(b), . . . , only two are shown explicitly for clarity of presentation. Although filesystem 41 may include many IBs 45A, 45B, . . . , only two are shown explicitly for clarity of presentation. Although filesystem 41 may include many files having respective inodes 43A, 43B, . . . , only two are shown explicitly for clarity of presentation.

Each inode 43 of the filesystem 41 is backed at a lower layer by backing store from container filesystem 48. As depicted, inode 43A is backed by inode backing 53A, and inode 43B is backed by inode backing 53B. It should be understood that the inode backings 53A, 53B might not be separately-addressable units of the container filesystem 48.

Each IB 45 of the filesystem 41 is backed (depicted by a dotted line) at a lower layer by backing store from container filesystem 48. As depicted, IB 45A is backed by IB backing 55A, and IB 45B is backed by IB backing 55B. It should be understood that the IB backings 55A, 55B might not be separately-addressable units of the container filesystem 48, although they are typically entire blocks (e.g., separately-addressable 8-kilobyte (KB) extents, although various other sizes are also possible).

Each data block 46 of the filesystem 41 is backed at a lower layer by backing store from container filesystem 48. As depicted, data block 46(a) is backed by data block backing 56(a), and data block 46(b) is backed by data block backing 56(b). It should be understood that the data block backings 56(a), 56(b) might not be separately-addressable units of the container filesystem 48, although they are typically entire blocks (e.g., separately-addressable 8-KB extents, although various other sizes are also possible).

Snapshot 42-1 represents the state of filesystem 41 at a prior instant in time when the second file represented by inode 43B did not yet exist. The first file, represented by inode 43A did exist, but snapshot includes a slightly different version, inode 43A', which differs from inode 43A in that it points to data block 46(b') rather than to data block 46(b). Data block 46(b') differs from data block 46(b), but it may only differ by as few as one bit. Thus, for example, the first file originally was represented by inode 43A' with data blocks 46(b') and 46(a). At some point after snapshot 42-1 was taken, the first file was modified by changing one or more bits within data block 46(b') to instead place data block 46(b) within the first file. Since data block 46(b') was directly pointed to by data pointer 44(1') within inode 43A', a write split occurred, meaning that the respective inodes 43A', 43A of the first file within the snapshot 42-1 and the filesystem 41 are now backed by two different respective inode backings 53A', 53A within container filesystem 48. Similarly, the original data block 46(b') and the revised data block 46(b), even though they are both located at the same logical address within the first file, are now backed by two different respective data block backings 56(b'), 56(b) within container filesystem 48. However, because data block 46(a) has not changed between the time that snapshot 42-1 was taken and the present, data block 46(a) of snapshot 42-1 is backed by the same data block backing 56(a) as is data block 46(a) of filesystem 41. Similarly, since data block 46(a) remains the same, data pointer 44(2) within IB 45A also remains the same, so (assuming that no other data pointers 44 within the IB 45A have changed either) IB 45A of snapshot 42-1 is backed by the same IB backing 55A as is IB 45A of filesystem 41.

Filesystem 41, snapshots 42, and container filesystem 48 all also contain a respective superblock 49 (only depicted in the context of container filesystem 48 for clarity), which contains certain organizational and layout information regarding its respective filesystem 41, 42, 48.

Memory 40 also stores a lower bound (LB) count 60, an upper bound (UB) estimate 62, and a deduplication feature flag 64 for each filesystem 41. These values 60, 62, 64 may be stored in any location, but, as depicted, they are all stored within the superblock 49 of container filesystem 48. In another embodiment, they may instead be stored within the superblock of filesystem 41. Deduplication feature flag 64 indicates whether or not deduplication is currently enabled for filesystem 41. If deduplication feature flag 64 is not set, then deduplication manager module 68 refrains from performing any new deduplication within filesystem 41 (although new snapshots 42 may still be taken, snapshotting relying on a different processes).

In operation, storage engine 65, executing on processing circuitry 33, receives I/O requests from hosts that are directed at filesystem 41 (or snapshots 42 or at other filesystems or their respective snapshots) and fulfills those requests by reading data (and metadata) from or writing data (and metadata) to the appropriate locations within the filesystem 41 (ultimately causing the data and metadata to be read from or written to backing store on storage drives 38). To the extent that metadata of a filesystem 41 or its snapshots 42 needs to be modified or the data of the filesystem 41 or its snapshots 42 needs to be reorganized, storage engine 65 calls on a filesystem manager module 66, also executing on processing circuitry 33. Storage engine 65 also calls on deduplication manager 68 to perform deduplication on write operations as long as the deduplication feature flag 64 is set. In some embodiments, storage engine 65 may also call upon a compression module (not depicted) to compress and decompress data within filesystem 41 and its snapshots 42.

In operation, as storage engine 65 operates to process the I/O requests, efficiency manager module 70, also executing on processing circuitry 33, also makes certain calculations and determinations based on metadata of the filesystem 41 and its snapshots 42 using the LB count 60 and UB estimate 64 as well. Ultimately, efficiency manager 70 decides whether or not to set or unset the deduplication feature flag 64, which affects whether deduplication manager 68 operates on the filesystem 41 and its snapshots 42.

Figure 2A:
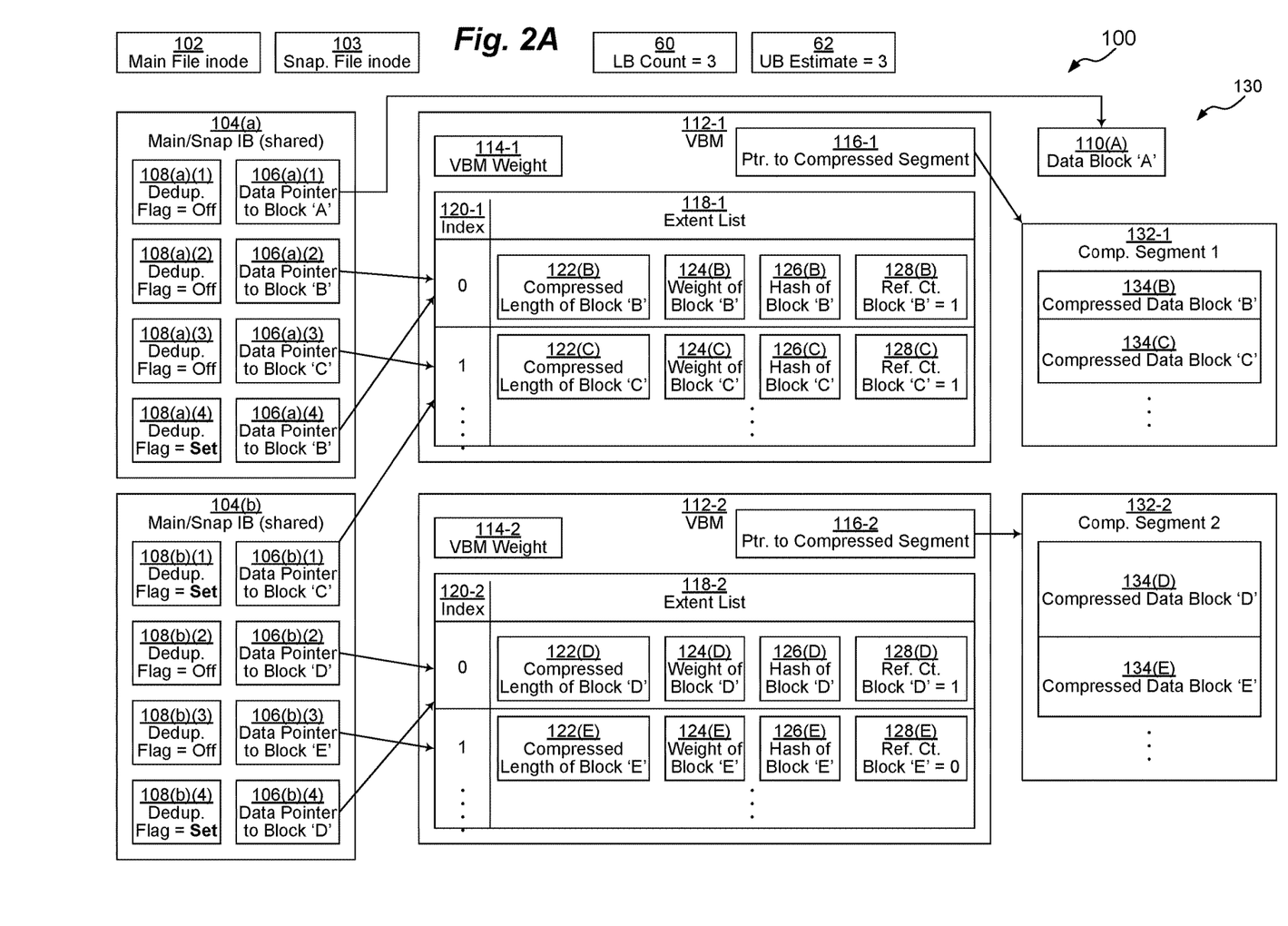
FIG. 2A is a block diagram depicting an example data structure configuration for use in conjunction with various embodiments prior to and while performing an example method according to various embodiments.

FIG. 2A shows an example data structure configuration 100 of a filesystem 41 prior to and during operation of techniques described herein. In this example, the filesystem 41 and a snapshot 42 have not yet diverged significantly (aside from the fact that a main file inode 102 and a snap file inode 103 both represent the same file within the filesystem 41 and snapshot 42, respectively). As depicted the filesystem 41 includes two IBs 104(a), 104(b) which may both be part of the same file or part or of two separate files). Both IBs 104(a), 104(b) are still shared between the filesystem 41 and the snapshot as depicted in configuration 100.

Each IB 104 includes four data pointers 106 (depicted as data pointers 106(a)(1), 106(a)(2), 106(a)(3), 106(a)(4) within IB 104(a) and data pointers 106(b)(1), 106(b)(2), 106(b)(3), 106(b)(4) within IB 104(b)). It should be understood that although only four data pointers 106 are depicted within each IB 104, in many embodiments, an IB 104 is capable of storing many more than four data pointers 106. Each data pointer 106 either points directly to a data block 110 (e.g., data pointer 106(a)(1) points directly to data block 110(A) within a data storage area 130) or it points to an intermediate pointing structure, such as a virtual block map (VBM) 112 as depicted (e.g., data pointer 106(a)(2) points to a particular entry having index 120 of zero within an extent list 118-1 of VBM 112-1, and that entry refers to an index into a compressed segment 132-1 pointed to by a segment pointer 116-1 within the VBM 112-1, which ultimately resolves to a compressed data block 134(B)). As depicted, VBMs 112 are used as intermediate structures used to organize compressed data blocks 134 stored within fixed-length segments 132 so that the non-block-aligned compressed data blocks 134 can be easily referred to by the data pointers 106 (by making intermediate reference to the VBM 112). VBMs 112 are also used to aid in deduplication as will be discussed below. In some embodiments, as depicted, VBMs 112 index only compressed data blocks 134, with deduplication also being permitted on the compressed data blocks 134. In other embodiments (not depicted), VBMs 112 may also be used to index uncompressed data blocks 110, which would allow for deduplication to apply to uncompressed data blocks as well.

The position of each data pointer 106 within an IB 104 indicates a logical address within a file (together with information about what the position of the IB 104 within metadata of the file is). IB 104 also stores a deduplication (dedup) flag 108 associated with each data pointer 106, the dedup flag 108 indicating whether or not the data within the block 110, 134 to which that data pointer 106 resolves has been deduplicated. If the dedup flag 108 is off, that indicates that at the time that its respective data pointer 106 was inserted into the IB 104, the data block 110, 134 to which it resolves had not yet been deduplicated. However, if the dedup flag 108 is set, that indicates that at the time that its respective data pointer 106 was inserted into the IB 104, the data block 134 to which it resolves had already been previously stored within a segment 132 and been pointed to (indirectly) by another data pointer 106 elsewhere within metadata of the filesystem 41or snapshots 42.

Each VBM 112 may include various pieces of information including a total VBM weight 114, a pointer 116 to a segment 132 associated with that VBM 112, and an extent list 118 that includes information about the compressed data blocks 134 with the segment 132. A segment 132 is an extent of storage of a certain pre-defined size (e.g., sixty-four KB or one megabyte, but any multiple of the block-size is possible; a typical block size is, for example, four KB, eight KB, sixteen KB, thirty-two KB, or sixty-four KB, but any block size could be used, typically a power of two). In one example embodiment, the block size is four KB (so an uncompressed data block 110 is four KB), and the size of a segment 132 is sixty-four KB. Since a compressed data block 134 is always no larger than an uncompressed data block 110 (or else it would not have been compressed), there should always be at least seventeen compressed data blocks 134 within a segment 132.

The extent list 118 within a VBM 112 identifies, in order, the compressed data blocks 134 within the segment 132 pointed to by the segment pointer 116 stored within the VBM 112. The index 120 within the extent list 118 represents the order of the compressed data blocks 134 within the segment 132. Since each different compressed data block 134 may have a different respective length, each entry in the extent list 118 includes the length 122 of the compressed data block 134 identified by that entry. That way, in order to identify the position of any given compressed data block 134 within the segment 132, the listed lengths 122 of the previous entries may be summed to find an offset into the segment 132 (possibly adding in a header length in embodiments, not depicted, in which short fixed-length headers precede every compressed data block 134 within segment 132). In another embodiment (not depicted), instead of (or in addition to) listing the length 122 of each compressed data block 134, the extent list 118 may include the offset into the segment 132 at which each compressed data block 134 begins.

Each entry within the extent list 118 may also include a hash digest 126 of the uncompressed version of the compressed data block 134 identified by that entry. This hash 126 allows for deduplication as is well-known in the art. Each entry may also include a weight 124 which is a value that is used to indicate how many different data pointers 106 point to that entry (both within the filesystem 41 and the snapshots 42) in order to be able to determine when the compressed data block 134 is no longer in use for garbage collection purposes.

In addition, each entry within the extent list 118 includes a reference count 128. The reference count 128 is zero if the respective compressed data block 134 has not yet been deduplicated. That is, when a compressed data block 134 is first written into its segment 132 and its entry is inserted into to extent list 118, the entry will typically only be pointed to by a single data pointer 106, so the reference count 128 for deduplication is zero. Once a second data pointer 106 for an IB 104 (or an inode 102) of the filesystem is set to point to the same entry (NOT for snapshotting), then the dedup flag 108 associated with that second data pointer 106 is set AND the reference count 128 within the entry is incremented. The reference count 128 is decremented when a deduplicated data entry 106 stops pointing to that entry.

As depicted in FIG. 2A, data pointer 106(a)(1) points directly to uncompressed data block 110(A) that contains data 'A.' Since it is uncompressed, the associated dedup flag 108(a)(1) is off.

Data pointer 106(a)(2) points to entry #0 of extent list 118-1 within VBM 112-1, which means that the data pointer 106(a)(2) indirectly resolves to compressed data block 134 (B) within segment 132-1 that contains data 'B' in compressed form. Even though it is compressed, since data pointer 106(a)(2) was the first location to point to this entry, the associated dedup flag 108(a)(2) is off.

Data pointer 106(a)(3) points to entry #1 of extent list 118-1 within VBM 112-1, which means that the data pointer 106(a)(3) indirectly resolves to compressed data block 134 (C) within segment 132-1 that contains data 'C' in compressed form. Even though it is compressed, since data pointer 106(a)(3) was the first location to point to this entry, the associated dedup flag 108(a)(3) is off.

Data pointer 106(*a*)(4) points to entry #0 of extent list 118-1 within VBM 112-1, which means that the data pointer 106(*a*)(2) indirectly resolves to compressed data block 134 (B) within segment 132-1 that contains data 'B' in compressed form. Since data pointer 106(*a*)(4) was NOT the first location to point to this entry, the associated dedup flag 108(*a*)(4) is set. Since there has been one deduplication performed on this entry, reference count 128(B) is set to one.

Data pointer 106(*b*)(1) points to entry #1 of extent list 118-1 within VBM 112-1, which means that the data pointer 106(*b*)(1) indirectly resolves to compressed data block 134 (C) within segment 132-1 that contains data 'C' in compressed form. Since data pointer 106(*b*)(1) was NOT the first location to point to this entry, the associated dedup flag 108(*b*)(1) is set. Since there has been one deduplication performed on this entry, reference count 128(C) is set to one.

Data pointer 106(*b*)(2) points to entry #0 of extent list 118-2 within VBM 112-2, which means that the data pointer 106(*b*)(2) indirectly resolves to compressed data block 134 (D) within segment 132-2 that contains data 'D' in compressed form. Even though it is compressed, since data pointer 106(*b*)(2) was the first location to point to this entry, the associated dedup flag 108(*b*)(2) is off.

Data pointer 106(*b*)(3) points to entry #1 of extent list 118-1 within VBM 112-1, which means that the data pointer 106(*b*)(3) indirectly resolves to compressed data block 134 (E) within segment 132-2 that contains data 'E' in compressed form. Even though it is compressed, since data pointer 106(*b*)(3) was the first location to point to this entry, the associated dedup flag 108(*a*)(3) is off. Since no other deduplications have been performed on this entry, reference count 128(E) is set to zero.

Data pointer 106(*b*)(4) points to entry #0 of extent list 118-2 within VBM 112-2, which means that the data pointer 106(*b*)(2) indirectly resolves to compressed data block 134 (D) within segment 132-2 that contains data 'D' in compressed form. Since data pointer 106(*b*)(4) was NOT the first location to point to this entry, the associated dedup flag 108(*b*)(4) is set. Since there has been one deduplication performed on this entry, reference count 128(D) is set to one.

Initially, the LB count 60 is set to equal three, which is the sum of all the reference counts 128. Initially, since there have not yet been any write splits introduced by snapshotting, the UB estimate 62 is equal to the LB count 60, so it is also equal to three.

Figure 2B:
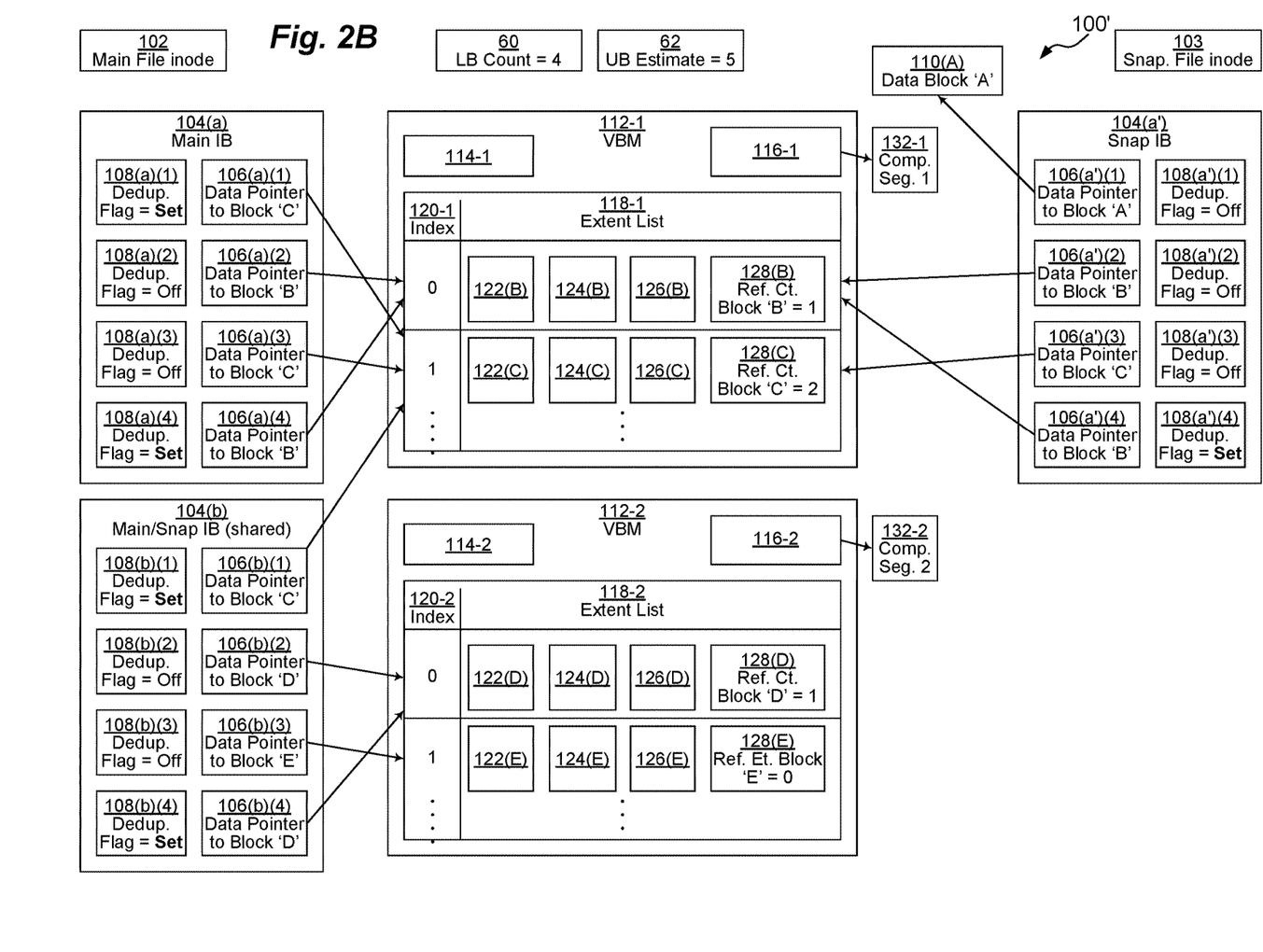
FIG. 2B is a block diagram depicting another example data structure configuration for use in conjunction with various embodiments prior to and while performing an example method according to various embodiments.

FIG. 2B then shows an updated example data structure configuration 100' after storage engine 65 processes a write command directed at an address specified by data block pointer 106(*a*)(1). The write command directs the storage engine 65 to overwrite that location within the file of IB 104(*a*) with data 'C,' so data block pointer 106(*a*)(1) no longer points to uncompressed data block 110(A) but it instead now points to entry #1 of extent list 118-1 within VBM 112-1, which means that the data pointer 106(*a*)(1) indirectly resolves to compressed data block 134(C) within segment 132-1 that contains data 'C' in compressed form. Since data pointer 106(*a*)(1) was NOT the first location to point to this entry, the associated dedup flag 108(*a*)(1) is now set. Since there have now been two deduplication performed on this entry, reference count 128(C) is incremented to a value of two. Since reference count 128(C) is incremented, LB count 60 and UB estimate 62 are also each incremented by one.

Because this write operation introduces a write split, IB 104(*a*) is no longer shared by snapshot 42. Thus, a copy of IB 104(*a*) from before the write (see FIG. 2A) is made and stored as snap IB 104(*a'*). At this point, the number of dedup flags 108(*a'*)(1)-(4) set within snap IB 104(*a*) is counted. Since the number of set dedup flags 108(*a'*)(4) is one, UB estimate 62 is incremented by that value (one). Thus, at the completion of the write operation, the LB count 60 has been incremented once and the UP estimate 62 has been incremented twice, so the LB count 60 now equals four, and the UB estimate 62 now equals five.

Figure 2C:
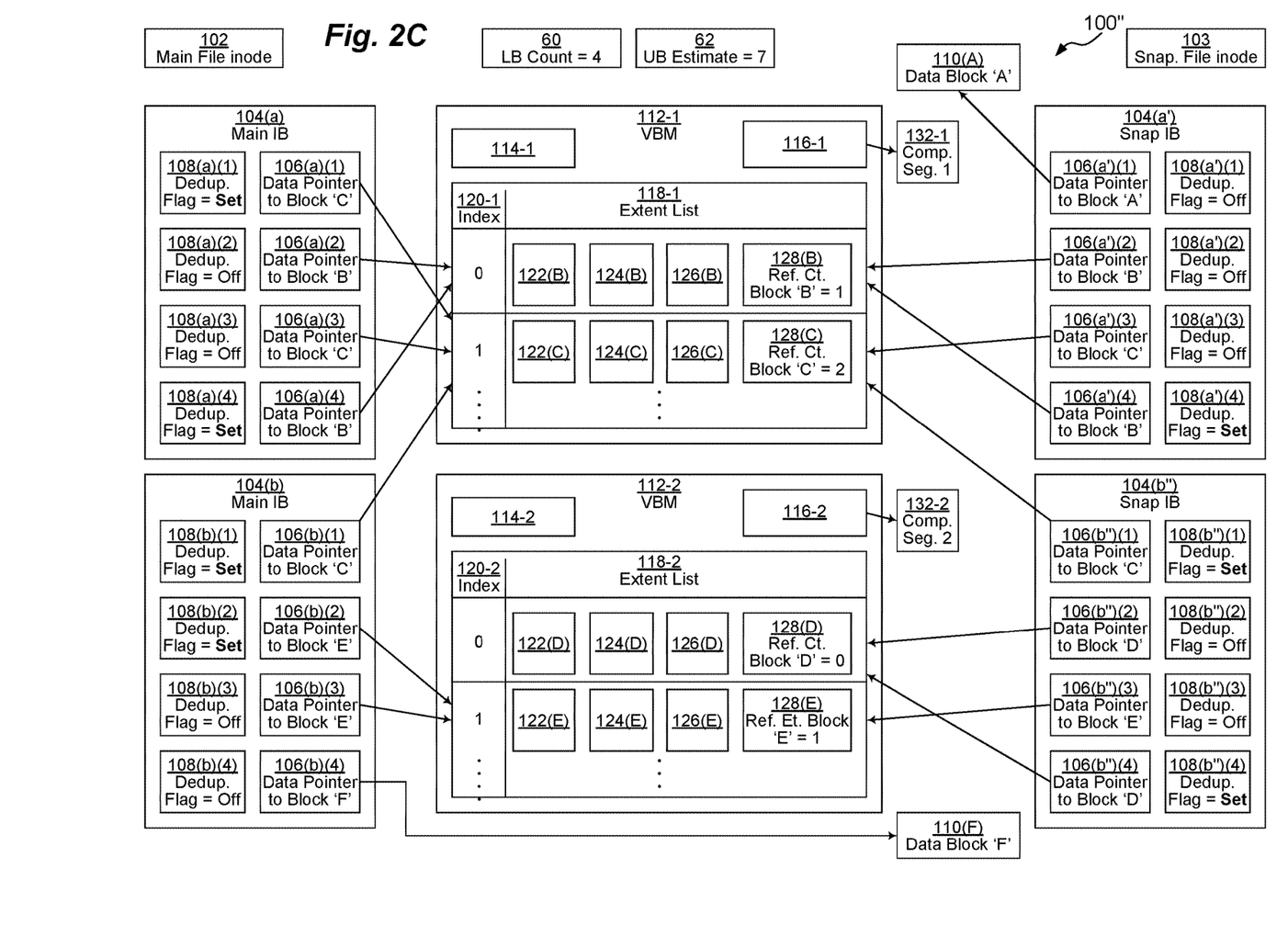
FIG. 2C is a block diagram depicting another example data structure configuration for use in conjunction with various embodiments prior to and while performing an example method according to various embodiments.

FIG. 2C then shows an updated example data structure configuration 100" after storage engine 65 processes two additional write commands directed at addresses specified by data block pointers 106(*b*)(2) and 106(*b*)(4).

The first write command directs the storage engine 65 to overwrite the location specified by 106(*b*)(2) within the file of IB 104(*b*) with data 'E,' so data block pointer 106(*b*)(2) no longer points to entry #0 of extent list 118-2 (which resolved to compressed data block 134(D)) but it instead now points to entry #1 of extent list 118-2 within VBM 112-2, which means that the data pointer 106(*b*)(2) indirectly resolves to compressed data block 134(E) within segment 132-2 that contains data 'E' in compressed form. Since data pointer 106(*b*)(2) no longer points to entry #0 of extent list 118-2 and since its reference count 128(D) was greater than zero (because you can't decrement below zero), the write represents a reverse deduplication, so reference count 128(D) is decremented by one, reducing it to zero. Since reference count 128(D) is decremented, LB count 60 and UB estimate 62 are also each decremented by one.

Since data pointer 106(*b*)(2) was NOT the first location to point to entry #1 of extent list 118-2, the associated dedup flag 108(*b*)(2) is now set. Since there has now been one deduplication performed on this entry, reference count 128 (E) is incremented to a value of one. Since reference count 128(E) is incremented, LB count 60 and UB estimate 62 are also each incremented by one.

Because this first write operation of FIG. 2C introduces a write split, IB 104(*b*) is no longer shared by snapshot 42. Thus, a copy of IB 104(*b*) from before the write (see FIG. 2B) is made and stored as snap IB 104(*b"*). At this point, the number of dedup flags 108(*b"*)(1)-(4) set within snap IB 104(*b"*) is counted. Since the number of set dedup flags 108(*b"*)(1), 108(*b"*)(4) is two, UB estimate 62 is incremented by that value (two).

The second write command of FIG. 2C directs the storage engine 65 to overwrite the location specified by 106(*b*)(4) within the file of IB 104(*b*) with new data 'F,' so data block pointer 106(*b*)(4) no longer points to entry #0 of extent list 118-2 (which resolved to compressed data block 134(D)) but it instead now points directly to new uncompressed data block 110(F). Since data pointer 106(*b*)(4) no longer points to entry #0 of extent list 118-2 and since its reference count 128(D) was already zero (because you can't decrement below zero), reference count 128(D) is NOT decremented. Since reference count 128(D) is not decremented, LB count 60 and UB estimate 62 are also not decremented.

Since data pointer 106(*b*)(4) now points to an uncompressed data block 110(F) (which cannot be deduplicated), the associated dedup flag 108(*b*)(4) is now turned off Thus, at the completion of the second write operation of FIG. 2C, the LB count 60 has been decremented once and incremented once, so the LB count 60 remains at four. The UP estimate 62 has been decremented once, incremented once, and then incremented again by two, so the UB estimate 62 now equals seven.

Figure 3:
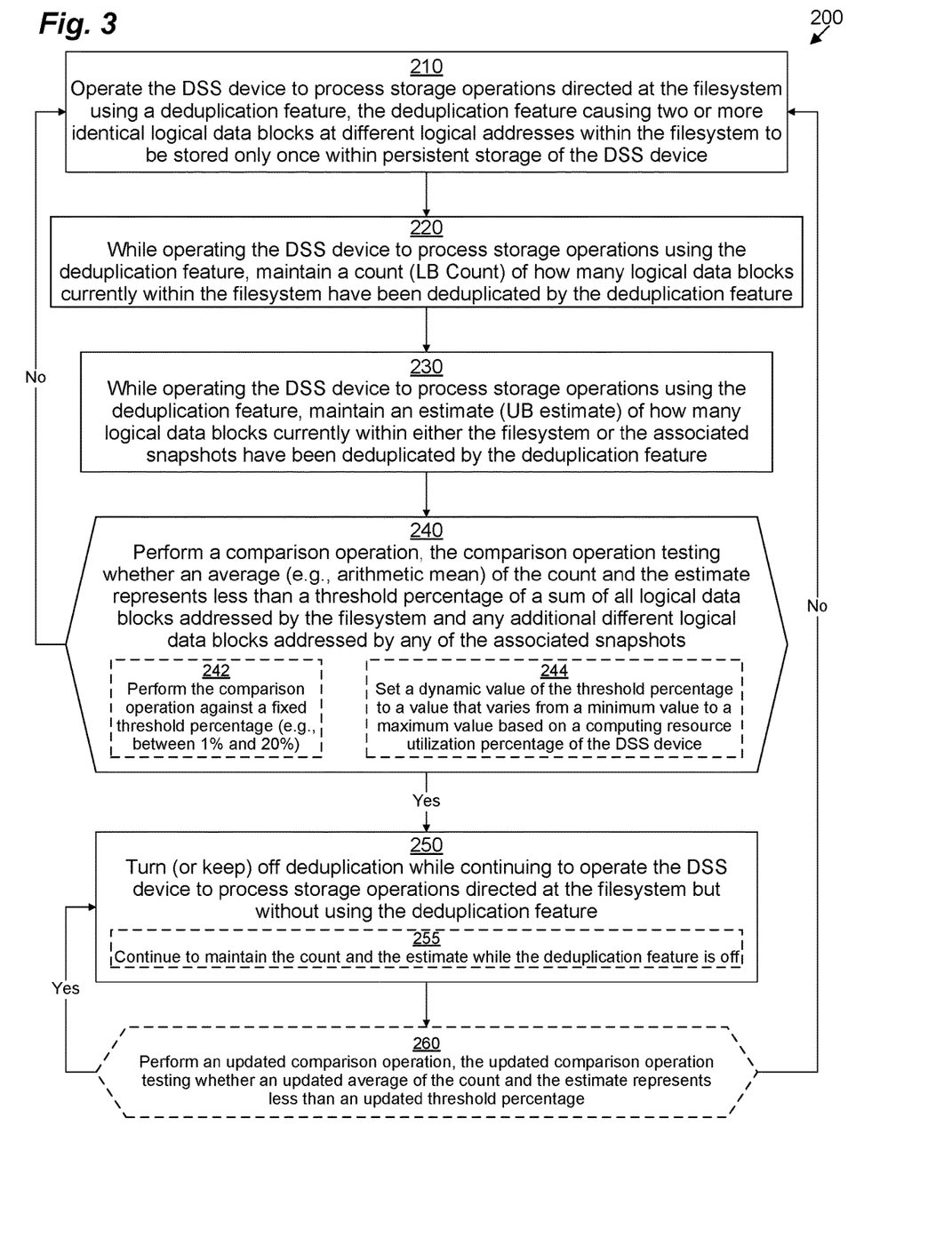
FIG. 3 is a flowchart depicting example methods of various embodiments.

FIG. 3 illustrates an example method 200 of improving operation of a data storage system device 32 hosting a filesystem 41 and snapshots 42 associated with the filesystem 41 in accordance with various embodiments. It should be understood that any time a piece of software (e.g., storage engine 65, filesystem manager 66, deduplication manager 68, efficiency manager 70, etc.) is described as performing a method, process, step, or function, in actuality what is meant is that a computing device (e.g., data storage system device 32) on which that piece of software is running performs the method, process, step, or function when executing that piece of software on its processing circuitry 33. It should be understood that one or more of the steps or sub-steps of method 200 may be omitted in some embodiments. Similarly, in some embodiments, one or more steps or sub-steps may be combined together or performed in a different order. Method 200 is performed by data storage system device 32.

In step 210, the data storage system device 32 is operated to process storage operations directed at the filesystem 41 using a deduplication feature, the deduplication feature causing two or more identical logical data blocks 46 at different logical addresses within the filesystem 41 to be stored only once within persistent storage of the data storage system device 32. Thus, storage engine 65 runs on data storage system device 32, processing data storage commands that come in from hosts and/or users. A typical storage command is a read or a write command directed at a particular logical address of the filesystem or at a particular logical address within a file. Logical addresses may be of various types, but a logical address typically identifies a particular logical data block 46 that is accessible from that logical address. In most filesystems 41, the smallest addressable unit of space is a logical block. A block refers to a fixed-length extent of data (e.g., four or eight KB or whatever the standard block size is for that filesystem 41) that is addressable within the address-space of the filesystem 41. The term "logical block" refers to an addressable unit of storage that, when read through the filesystem 41, resolves to a block having the standard block size. In the case of uncompressed data, a logical block 46 is an uncompressed data block 110 that is the standard block length in length. However, when using compression, a logical block 46 may actually be stored as a compressed data block 132 taking up less than the standard block length on a the storage drives 38, even though the compressed data block 132 actually resolves to exactly the standard block length in length once decompressed. In operation, storage engine 65 makes calls to various other modules, including filesystem manager 66 and deduplication manager 70, to fulfill the data storage operations (specifically calling the deduplication manager 70 to perform the deduplication).

In step 220, while operating the data storage system device 32 to process storage operations using the deduplication feature, the efficiency manager 70 (or, in some embodiments, the deduplication manager 68 or filesystem manager 66) maintains a count (e.g., LB Count 60 stored within the superblock 49) of how many logical data blocks 46 currently within the filesystem 41 have been deduplicated by the deduplication feature. This may involve setting and unsetting deduplication flags 108 within inodes 102 and IBs 104 of the filesystem 41 and/or incrementing and decrementing reference counts 128 within VBMs 112 of files of the filesystem 41. Typically, the total number of set deduplication flags 108 within inodes 102 and IBs 104 of files of the filesystem 41 (but not including inodes 103 and IBs 104 that are within snapshots 42 but no longer part of the main filesystem 41) will equal the LB count 60. Alternatively, the LB count 60 may instead by kept track of by incrementing or decrementing the LB count 60 as stored within the superblock 49 whenever a reference count 128 is incremented or decremented, respectively. Further detail with respect to keeping track of the LB count 60 in connection with a specific embodiment is described below in connection with FIG. 4.

In step 230, while operating the data storage system device 32 to process storage operations using the deduplication feature, the efficiency manager 70 (or, in some embodiments, the deduplication manager 68 or filesystem manager 66) maintains an estimate (e.g., UB estimate 62 stored within the superblock 49) of how many logical data blocks currently within either the filesystem 41 or the associated snapshots 42 have been deduplicated by the deduplication feature. This UB estimate 62 differs from the LB count 60 because it also makes reference to logical blocks 46 that are no longer accessible in the main filesystem 41 (at least not at the same logical address anymore) due to having been deleted but still accessible within a snapshot 42. However, it is quite difficult to actually count all logical blocks 46 that are accessible within either the main filesystem 41 or the various snapshots 41 that have been saved due to deduplication without overcounting or undercounting, so instead, the UB estimate 62 is just an upper bound, which we know does not exceed the actual number (and we also know that the number is no less than the LB count 60). In order to estimate the true value, the LB count 60 and the UB estimate may therefore be averaged. UB estimate 62 is generally increased or decreased whenever the LB count 60 is increased or decreased, respectively, but the UB estimate 62 may also be increased or decreased at other times as well (e.g., when a write split causes an inode 102 or IB 104 within the main filesystem 41 to no longer be valid with respect to a snapshot 41, causing a new inode 103 or IB 104 to be created for the snapshot; at that point, the UB estimate 62 may be incremented by the total number of set deduplication flags 108 within the newly-created inode 103 or IB 104). Further detail with respect to keeping track of the UB estimate 62 in connection with a specific embodiment is described below in connection with FIG. 4.

Although steps 210, 220, and 230 have been depicted as being sequential, they are actually performed in parallel. Thus, steps 220 and 230 may be thought of as background tasks that are both performed (either at the same time or in any order) during the operation of step 210 (e.g., at certain specific times during fulfillment of data storage operations).

Out of band with steps 210-230, step 240 may be performed every so often (e.g., in one embodiment periodically; in another embodiment after every time that the LB count and/or UB estimate 62 is/are updated), even though it is depicted as being performed as part of a loop in connection with steps 210-230. In step 240, efficiency manager 70 performs a comparison operation, the comparison operation testing whether an average (e.g., an arithmetic mean, although other types of averages may also be used) of the LB count 60 and the UB estimate 62 (although, in some embodiments, another type of heuristic may be used to estimate the actual block savings due to deduplication other than a type of average) represents less than a threshold percentage of a sum of all logical data blocks 46 addressed by the filesystem 41 and any additional different logical data blocks 46 addressed by any of the associated snapshots 42. In one embodiment (represented by sub-step 242), the comparison is performed against a fixed threshold percentage (e.g., 10% or some other fixed percentage representing the minimum effective savings ratio that an administrator deems necessary to make performing deduplication worthwhile, typically within the range of 1% to 20%). In another embodiment (represented by sub-step 244), instead of an administrator selecting the threshold percentage in advance, the threshold percentage is dynamically-calculated based on a computer resource utilization percentage (e.g., indicating a percentage of CPU cycles being used by processing circuitry 33, a percentage of system memory of the data storage device 32 or one of its storage processor boards being used, or some combination thereof). In some embodiments, the computer resource utilization percentage may be based on a running average or some other type of smoothed average so that it is not susceptible to temporary minor variations. In some embodiments, the threshold percentage varies directly with the CPU utilization or memory usage (possibly smoothed) based on a formula of the type $T=P+U\times Q$, where T is the dynamic threshold percentage, U is the utilization percentage, P is a minimal value for T, and Q is a maximal value for T. Thus, in one embodiment in which P is 1% and Q is 20%, the dynamic threshold percentage will vary linearly between 1% (when system utilization is zero) and 20% (when system utilization is at 100%). Other more complex (or simple) formulas may be used in other embodiments. The percentage is calculated out of a total number of logical data blocks 46 addressed by the filesystem 41 as well as any additional different logical data blocks 46 addressed by any of the snapshots 42. This value may be calculated by adding the total number of blocks allocated as backing 56 within the container filesystem 48 plus the calculated average of the LB count 60 and the UB estimate 62. For example, if the LB count 60 is 500, the UB estimate 62 is 800, the total number of allocated data block backings 56 within the container filesystem 48 is 7,000, and the threshold percentage is 10%, then step 240 would compare ((500+800)/2)/(7,000+((500+800)/2)), or approximately 8.5%, against 10%. Since 8.5%<10%, step 240 would yield an affirmative result.

After step 240, efficiency manager 70 performs step 250 if the comparison result is affirmative (i.e., if the savings ratio due to deduplication is less than the threshold), but, if the comparison result is negative (i.e., if the savings ratio due to deduplication is greater than or equal to the threshold), then efficiency manager 70 does not perform step 250, instead looping back and continuing to perform steps 210-230 as before.

In step 250, efficiency manager 70 turns off (or, if it is already off, it keeps off) the deduplication feature while continuing to operate the data storage system device 32 to process storage operations directed at the filesystem 41 but without using the deduplication feature. Thus, step 250 is similar to step 210 except that when processing storage operations, storage engine 65 refrains from making calls to the deduplication manager 68 to perform deduplication on any data blocks 46, 110, 134.

In some embodiments (e.g., in embodiments having a fixed threshold percentage), once deduplication is turned off, it remains off until a user turns it back on. In other embodiments, step 250 includes optional sub-step 255, in which the efficiency manager 70 (or the deduplication manager 68) continues to keep the LB count 60 and the UB estimate 62 current as operation proceeds, even though new deduplication events are not taking place. Thus, in step 250, the LB count 60 may decrease when a write operation causes an address within the filesystem 41 that previously stored a deduplicated block is updated to instead store a non-deduplicated block, but the LB count 60 will typically not increase as part of step 250. Similarly, the UB estimate 62 may also decrease when a write operation causes an address within a snapshot 42 that previously stored a deduplicated block is updated to instead store a non-deduplicated block. However, the UB estimate 62 may still increase if there is a write split introduced by a write to the filesystem 41 that causes a new inode 103 or IB 104 to be allocated for a snapshot 42.

In step 260, which is only performed in embodiments in which sub-step 255 is performed as part of step 250, efficiency manager 70 performs an updated comparison operation, the updated comparison operation testing whether an updated average of the LB count 60 and the UB estimate 62 (which have been kept updated in sub-step 250) continues to represents less than an updated threshold percentage of the sum of all logical data blocks 46 addressed by the filesystem 41 and any additional different logical data blocks 46 addressed by any of the associated snapshots 42. Since the system utilization constantly varies (even when smoothing is used), after a period of heavy utilization the utilization may drop so that the dynamic threshold percentage is now low enough that continued operation of deduplication can be justified even if the savings ratio is not that high.

After step 260, efficiency manager 70 continues to perform step 250 if the comparison result is affirmative (i.e., if the savings ratio due to deduplication is still less than the threshold), but, if the comparison result is negative (i.e., if the savings ratio due to deduplication is now greater than or equal to the threshold), then efficiency manager 70 does not perform step 250, instead turning deduplication back on again and then looping back and continuing to perform steps 210-230 as before.

Figure 4:
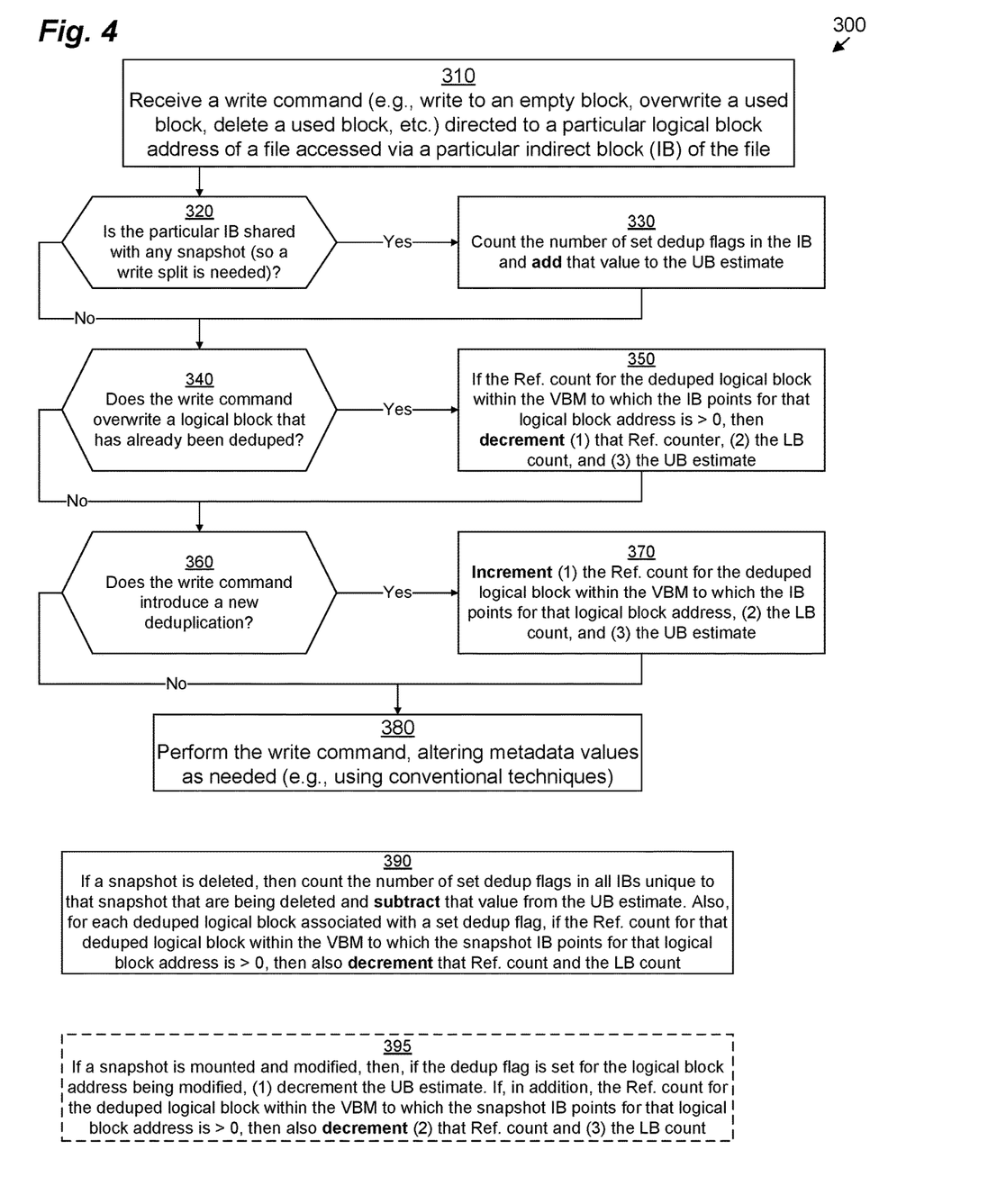
FIG. 4 is a flowchart depicting example methods of various embodiments.

FIG. 4 illustrates an example method 300. Method 300 represents an example implementation of steps 210-230 from method 200 in more detail. It should be understood that one or more of the steps or sub-steps of method 300 may be omitted in some embodiments. Similarly, in some embodiments, one or more steps or sub-steps may be combined together or performed in a different order. Method 300 is performed by data storage system device 32.

In step 310, storage engine 65 receives a write command (e.g., a command to write to an empty block, overwrite a used block, delete a used block, etc.) directed to a particular logical block address of a file accessed via a particular IB 45, 104 of the file. It should be understood that, although in the context of step 210 from FIG. 3, storage engine 65 may process any kind of storage command, in the context of step 310 only write commands are discussed because read commands do not cause any change in the way data or metadata is stored, so the LB count 60 and the UB estimate 62 are not affected by read commands. It should also be understood that method 300 is only being described in the context of write commands that involve IBs 45, 104, even though a similar method could be performed in the context of write commands that address a logical block pointed directly at by an inode 43, 102. This is only for the sake of simplicity of description since most files (other than very small files) include at least one IB 25, 104. It should also be understood that the write command may be received from a host or a user or it may be generated within the data storage system device 32 itself (e.g., it may be a write caused by deduplication manager 68 in performing a background deduplication process).

It should also be understood that in the context of method 300, a "write command" is deemed to only refer to one logical block at a time. If a command to write more than one logical block is received by the storage engine 65, it may process the command for all such logical blocks together, but it will result in a more complicated version of method 300. Any person having ordinary skill in the art would understand how to apply method 300 to the more complex case involving a multi-block write.

For purposes of illustration, assume that the write command of method 300 is directed at a logical block addressed by a particular inode 104(X) at the Y-th pointer 106(X)(Y) of that inode 104(X).

In step 320, efficiency manager 70 (or deduplication manager 68, but assume it is the efficiency manager 70 throughout this description of method 300 for simplicity) determines whether or not the particular IB 104(X) is currently shared with at least one snapshot 42. If it is, then operation proceeds with step 330, since a write split is occurring. Otherwise, since the particular IB 104(X) is not currently shared with any snapshot, operation proceeds directly with step 340.

In step 330, efficiency manager 70 counts the number of set dedup flags 108 within the particular IB 104(X) and adds that counted number to the UB estimate 62 in the superblock 49. If the write has not yet been performed, the number of set dedup flags 108 may be counted from the particular IB 104(X). If however, step 330 is instead performed concurrently with the write, then the number of set dedup flags 108 must instead be counted from the version of the IB 104(X') generated for the snapshot 42. See for example the transition between FIGS. 2A and 2B with respect to IBs 104(a), 104(a'). After step 330, operation proceeds with step 340.

In step 340, efficiency manager 70 determines whether or not the write command happens to be directed at an address whose data block pointer 106(X)(Y) already resolves to a (compressed) data block 134 that has already been deduplicated. For example, this is the case if the data block pointer 106(X)(Y) points to an entry within an extent list 118 that contains a reference count 128 that is greater than zero. See for example the transition between FIGS. 2B and 2C with respect to the first write addressed at data block pointer 16(b)(2). In some embodiments (not consistent with the approach of FIGS. 2B-2C), instead of looking at the entry of the extent list 118 pointed to by the data block pointer 106(X)(Y), efficiency manager may instead look at the associated dedup flag 108(X)(Y) within the IB 104(X) and detect that it was previously deduplicated if that flag 108(X)(Y) is currently set.

If step 340 yields an affirmative result (i.e., it is directed at a logical address for a logical block that was already deduplicated), then operation proceeds with step 350. Otherwise, operation proceeds directly to step 360.

In step 350, because a deduplicated block is being overwritten it means that the number of actively deduplicated blocks is decreasing, so efficiency manager 70 decrements the reference count 128, the LB count 60, and the UB estimate 62 (the term "decrement" as used herein always means decrease by one unless a specified number to decrement by is given, in which case it means to decrease by that specified number). Since the reference count 128 is already greater than zero, this will never decrease the reference count below zero. However, in some embodiments (e.g., if the dedup flag 106 is checked in step 340 rather than the reference count 128) it may be possible for the reference count 128 to already be at zero; in that event, none of the reference count 128, the LB count 60, and the UB estimate 62 are decremented in step 350. After step 350, operation proceeds with step 360.

In step 360, efficiency manager 70 determines whether or not the write command writes data that is deduplicable (e.g., its hash is the same as some other hash 126 of another block 134 already stored within filesystem 41 or one of its snapshots 42) based on application of in-line deduplication by deduplication manager 68. In embodiments in which deduplication is only performed as a background process, step 360 may be skipped for writes coming in from a host or user (but it must still be performed for writes that result from background deduplication); in those embodiments, operation proceeds directly to step 380.

If step 360 yields an affirmative result (i.e., it introduces a need for deduplication), then operation proceeds with step 370. Otherwise, operation proceeds directly to step 380.

In step 370, because a new deduplication is being performed, it means that the number of actively deduplicated blocks is increasing, so efficiency manager 70 increments the LB count 60, the UB estimate 62, and the reference count 128 within the new entry that the data block pointer 106(X)(Y) will point to once the write is performed (the term "increment" as used herein always means increase by one unless a specified number to increment by is given, in which case it means to increase by that specified number). After step 370, operation proceeds with step 380.

In step 380, storage engine 65 actually performs the write command by writing the received data to disk 38 (or to the next layer in the storage stack) as data block 110, 134 (unless it need not be written due to deduplication) and altering the filesystem metadata structures 43, 44, 45, 46, 102, 103, 104, 106, 108, 112, 114, 118, 122, 124, 126, etc. as needed. It should be understood that, in some embodiments, step 380 may be performed concurrently with steps 320-370 instead of afterwards.

Out of band with steps 310-280 (i.e., not in connection with a write command directed at a particular logical block address of the filesystem 41) step 390 (and, in some embodiments, step 395) may also be performed as part of method 300 implementing steps 210-230.

In step 390, if a particular snapshot 42-Z is deleted, then efficiency manager 70 counts the number of set dedup flags 108 in all IBs 104 unique to that snapshot 42-Z that are being deleted and subtracts that value from the UB estimate 62. In addition, for each deduplicated logical block associated with a set dedup flag 108, if the reference count 128 for that deduplicated logical block within the VBM 112 to which the snapshot IB 104 points for that logical block address is >0, then efficiency manager 70 also decrements that reference count 128 and the LB count 60. This step is effectively the reverse of step 330, since the write split is going away. Thus, if the snapshot 42 depicted in FIG. 2C is deleted, since three dedup flags 108(a')(4), 108(b")(1), 108(b")(4) are set, efficiency manager 70 would subtract three from the UB estimate 62 to yield a new UB estimate 62 equaling four. In addition, since two of the reference counts 128(B), 128(C) for entries pointed to by the three deduplicated pointers 106(a')(4), 106(b")(1), 106(b")(4) are greater than zero, reference counts 128(B), 128(C) would each be decremented by one, and LB count 60 would be decremented by two to yield a new LB count 60 equaling two.

In step 395, in embodiments in which it is possible to mount a snapshot and to actively make modifications to that snapshot, if a particular snapshot 42-Z is mounted and then modified by writing to a logical address defined by data pointer 106(Q)(R), then, if the dedup flag 108(Q)(R) is set for the logical block address within the IB 104 being modified, then the efficiency manager 70 would decrement the UB estimate 62. If, in addition, the reference count 128 for the entry pointed to by the data block pointer 106(Q)(R) is greater than zero, then the efficiency manager 70 would also decrement that reference count 128 as well as the LB count 60. Thus, if the snapshot 42 depicted in FIG. 2C were mounted and then a write command were received to delete the logical address pointed to by data block pointer 106(b") (3), no decrementing would take place because dedup flag 108(*b*")(3) is off. However, if a write command were received to delete the logical address pointed to by data block pointer 106(*a*")(4) instead, because dedup flag 108 (*a*")(3) is set AND because reference count 128(B) is greater than zero, then then the efficiency manager 70 would decrement the UB estimate 62, the LB count 60, and the reference count 128(B), yielding new UB estimate 62 equaling six, a new LB count equaling three, and a new reference count 128(B) equaling zero.

Thus, techniques have been presented for effectively measuring the amount of space saved due to deduplication and selectively turning deduplication off for a filesystem 41 if the savings are too low. This task can be particularly challenging in the context of filesystems 41 having point-in-time snapshots 42 of previous states of the filesystem 41, since snapshots 42 often exploit redundancy to save space and it can be difficult to distinguish savings due to deduplication from the use of redundancy-exploiting snapshots 42. Thus, embodiments are directed to techniques that overcome this difficulty by maintaining both a lower bound (LB count 60) and an upper bound (UB estimate 62) for block savings due exclusively to deduplication rather than due to snapshots and using an average of the lower 60 and upper 62 bounds to estimate the actual savings due to deduplication in order decide whether to continue operating deduplication or not.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

What is claimed is:

1. A method of improving operation of a data storage system (DSS) device hosting a filesystem and snapshots associated with the filesystem, the method comprising:
    operating the DSS device to process storage operations directed at the filesystem using a deduplication feature, the deduplication feature causing two or more identical logical data blocks at different logical addresses within the filesystem to be stored only once within persistent storage of the DSS device;
    while operating the DSS device to process storage operations using the deduplication feature, maintaining a count of how many logical data blocks currently within the filesystem have been deduplicated by the deduplication feature;
    while operating the DSS device to process storage operations using the deduplication feature, maintaining an estimate of how many logical data blocks currently within either the filesystem or the associated snapshots have been deduplicated by the deduplication feature;
    performing a comparison operation, the comparison operation testing whether an average of the count and the estimate represents less than a threshold percentage of a sum of all logical data blocks addressed by the filesystem and any additional different logical data blocks addressed by any of the associated snapshots;
    in response to the comparison operation yielding a negative result, continuing to operate the DSS device to process storage operations directed at the filesystem using the deduplication feature; and
    in response to the comparison operation yielding an affirmative result, turning off deduplication while continuing to operate the DSS device to process storage operations directed at the filesystem but without using the deduplication feature.

2. The method of claim 1 wherein maintaining the count of how many logical data blocks currently within the filesystem have been deduplicated by the deduplication feature includes:
    upon the DSS device performing a deduplication of a first logical data block already stored within the filesystem in response to processing a storage operation directing the filesystem to write a copy of the first logical data block to a new address within the filesystem:
        incrementing the count; and
        incrementing a respective reference counter within a first intermediate pointing structure (IPS) that points to the first logical data block, the first IPS including a plurality of reference counters associated with respective logical data blocks to which the first IPS points, the first IPS being itself pointed to by (1) a first file mapping structure (FMS) for the new address and (2) a second FMS for an address at which the first logical data block was already stored within the filesystem; and
    upon the DSS device performing a reverse deduplication of a second logical data block stored within the filesystem in response to processing a storage operation directing the filesystem to delete a copy of the second logical data block from a deletion address within the filesystem:
        decrementing the count; and
        decrementing a respective reference counter within a second IPS that points to the second logical data block, the second IPS including a plurality of reference counters associated with respective logical data blocks to which the second IPS points, the second IPS being itself pointed to by (1) a third FMS for the deletion address and (2) a fourth FMS for an address at which the second logical data block remains stored within the filesystem.

3. The method of claim 2 wherein maintaining the estimate of how many logical data blocks currently within either the filesystem or the associated snapshots have been deduplicated by the deduplication feature includes:
upon the DSS device performing the deduplication of the first logical data block, further:
incrementing the estimate; and
setting a respective deduplication flag for the new address within the first FMS;
upon the DSS device performing the reverse deduplication of the second logical data block, further:
decrementing the estimate; and
unsetting a respective deduplication flag for the deletion address within the third FMS; and
upon the DSS device processing a storage command directing the DSS device to write to a writing address of the filesystem, the writing address being defined within a fifth FMS, the fifth FMS being shared with a snapshot associated with the filesystem:
creating a sixth FMS as a copy of the fifth FMS, the sixth FMS becoming part of the snapshot in place of the fifth FMS, the fifth FMS remaining part of the filesystem; and
incrementing the estimate by a total number of deduplication flags that are set within the sixth FMS.

4. The method of claim 3 wherein maintaining the estimate of how many logical data blocks currently within either the filesystem or the associated snapshots have been deduplicated by the deduplication feature further includes, upon the DSS device processing a storage command directing the DSS device to delete the snapshot, decrementing the estimate by a total number of deduplication flags that are set within all the FMSes that are not shared with the filesystem or any other snapshot.

5. The method of claim 1 wherein the threshold percentage is a fixed value within a range of 1% to 20%.

6. The method of claim 1,
wherein the threshold percentage is a dynamic value; and
wherein performing the comparison operation includes setting the dynamic value of the threshold percentage to value that varies from a minimum value to a maximum value based on a computing resource utilization percentage of the DSS device.

7. The method of claim 6,
wherein turning off deduplication while continuing to operate the DSS device to process storage operations directed at the filesystem but without using the deduplication feature includes continuing to maintain the count and the estimate while the deduplication feature is off; and
wherein the method further comprises, subsequent to turning off deduplication:
performing an updated comparison operation, the updated comparison operation testing whether an updated average of the count and the estimate represents less than an updated threshold percentage of an updated sum of all logical data blocks addressed by the filesystem and any additional different logical data blocks addressed by any of the associated snapshots;
in response to the updated comparison operation yielding a negative result, turning deduplication back on while continuing to operate the DSS device to process storage operations directed at the filesystem while using the deduplication feature; and
in response to the updated comparison operation yielding an affirmative result, continuing to operate the DSS device to process storage operations directed at the filesystem without using the deduplication feature.

8. The method of claim 1 wherein performing the comparison operation includes computing the average as an arithmetic mean of the count and the estimate.

9. The method of claim 1 wherein performing the comparison operation includes calculating the sum of all logical data blocks addressed by the filesystem and any additional different logical data blocks addressed by any of the associated snapshots by summing:
a number of blocks backing logical data blocks currently within either the filesystem or the associated snapshots; and
the average of the count and the estimate.

10. A computer program product comprising a non-transitory computer-readable storage medium storing a set of instructions, which, when executed by control circuitry of a data storage system (DSS) device, cause the control circuitry to improve operation of the DSS device hosting a filesystem and snapshots associated with the filesystem by:
operating the DSS device to process storage operations directed at the filesystem using a deduplication feature, the deduplication feature causing two or more identical logical data blocks at different logical addresses within the filesystem to be stored only once within persistent storage of the DSS device;
while operating the DSS device to process storage operations using the deduplication feature, maintaining a count of how many logical data blocks currently within the filesystem have been deduplicated by the deduplication feature;
while operating the DSS device to process storage operations using the deduplication feature, maintaining an estimate of how many logical data blocks currently within either the filesystem or the associated snapshots have been deduplicated by the deduplication feature;
performing a comparison operation, the comparison operation testing whether an average of the count and the estimate represents less than a threshold percentage of a sum of all logical data blocks addressed by the filesystem and any additional different logical data blocks addressed by any of the associated snapshots;
in response to the comparison operation yielding a negative result, continuing to operate the DSS device to process storage operations directed at the filesystem using the deduplication feature; and
in response to the comparison operation yielding an affirmative result, turning off deduplication while continuing to operate the DSS device to process storage operations directed at the filesystem but without using the deduplication feature.

11. The computer program product of claim 10 wherein maintaining the count of how many logical data blocks currently within the filesystem have been deduplicated by the deduplication feature includes:
upon the DSS device performing a deduplication of a first logical data block already stored within the filesystem in response to processing a storage operation directing the filesystem to write a copy of the first logical data block to a new address within the filesystem:

incrementing the count; and incrementing a respective reference counter within a first intermediate pointing structure (IPS) that points to the first logical data block, the first IPS including a plurality of reference counters associated with respective logical data blocks to which the first IPS points, the first IPS being itself pointed to by (1) a first file mapping structure (FMS) for the new address and (2) a second FMS for an address at which the first logical data block was already stored within the filesystem; and upon the DSS device performing a reverse deduplication of a second logical data block stored within the filesystem in response to processing a storage operation directing the filesystem to delete a copy of the second logical data block from a deletion address within the filesystem:

decrementing the count; and decrementing a respective reference counter within a second IPS that points to the second logical data block, the second IPS including a plurality of reference counters associated with respective logical data blocks to which the second IPS points, the second IPS being itself pointed to by (1) a third FMS for the deletion address and (2) a fourth FMS for an address at which the second logical data block remains stored within the filesystem.

12. The computer program product of claim 11 wherein maintaining the estimate of how many logical data blocks currently within either the filesystem or the associated snapshots have been deduplicated by the deduplication feature includes:

upon the DSS device performing the deduplication of the first logical data block, further:

incrementing the estimate; and setting a respective deduplication flag for the new address within the first FMS;

upon the DSS device performing the reverse deduplication of the second logical data block, further:

decrementing the estimate; and unsetting a respective deduplication flag for the deletion address within the third FMS; and upon the DSS device processing a storage command directing the DSS device to write to a writing address of the filesystem, the writing address being defined within a fifth FMS, the fifth FMS being shared with a snapshot associated with the filesystem:

creating a sixth FMS as a copy of the fifth FMS, the sixth FMS becoming part of the snapshot in place of the fifth FMS, the fifth FMS remaining part of the filesystem; and incrementing the estimate by a total number of deduplication flags that are set within the sixth FMS.

13. The computer program product of claim 12 wherein maintaining the estimate of how many logical data blocks currently within either the filesystem or the associated snapshots have been deduplicated by the deduplication feature further includes, upon the DSS device processing a storage command directing the DSS device to delete the snapshot, decrementing the estimate by a total number of deduplication flags that are set within all the FMSes that are not shared with the filesystem or any other snapshot.

14. An apparatus comprising:

persistent storage devices providing data storage;

network interface circuitry configured to communicate with a host over a network; and processing circuitry coupled to memory to form a control circuit constructed and arranged to improve operation of the apparatus hosting a filesystem and snapshots associated with the filesystem by:

operating to process storage operations directed at the filesystem using a deduplication feature, the deduplication feature causing two or more identical logical data blocks at different logical addresses within the filesystem to be stored only once within the provided data storage;

while operating to process storage operations using the deduplication feature, maintaining a count of how many logical data blocks currently within the filesystem have been deduplicated by the deduplication feature;

while operating to process storage operations using the deduplication feature, maintaining an estimate of how many logical data blocks currently within either the filesystem or the associated snapshots have been deduplicated by the deduplication feature;

performing a comparison operation, the comparison operation testing whether an average of the count and the estimate represents less than a threshold percentage of a sum of all logical data blocks addressed by the filesystem and any additional different logical data blocks addressed by any of the associated snapshots;

in response to the comparison operation yielding a negative result, continuing to operate to process storage operations directed at the filesystem using the deduplication feature; and in response to the comparison operation yielding an affirmative result, turning off deduplication while continuing to operate to process storage operations directed at the filesystem but without using the deduplication feature.

* * * * *